W. P. MORROW.
CULTIVATOR.
APPLICATION FILED DEC. 6, 1913.
1,130,924.
Patented Mar. 9, 1915.
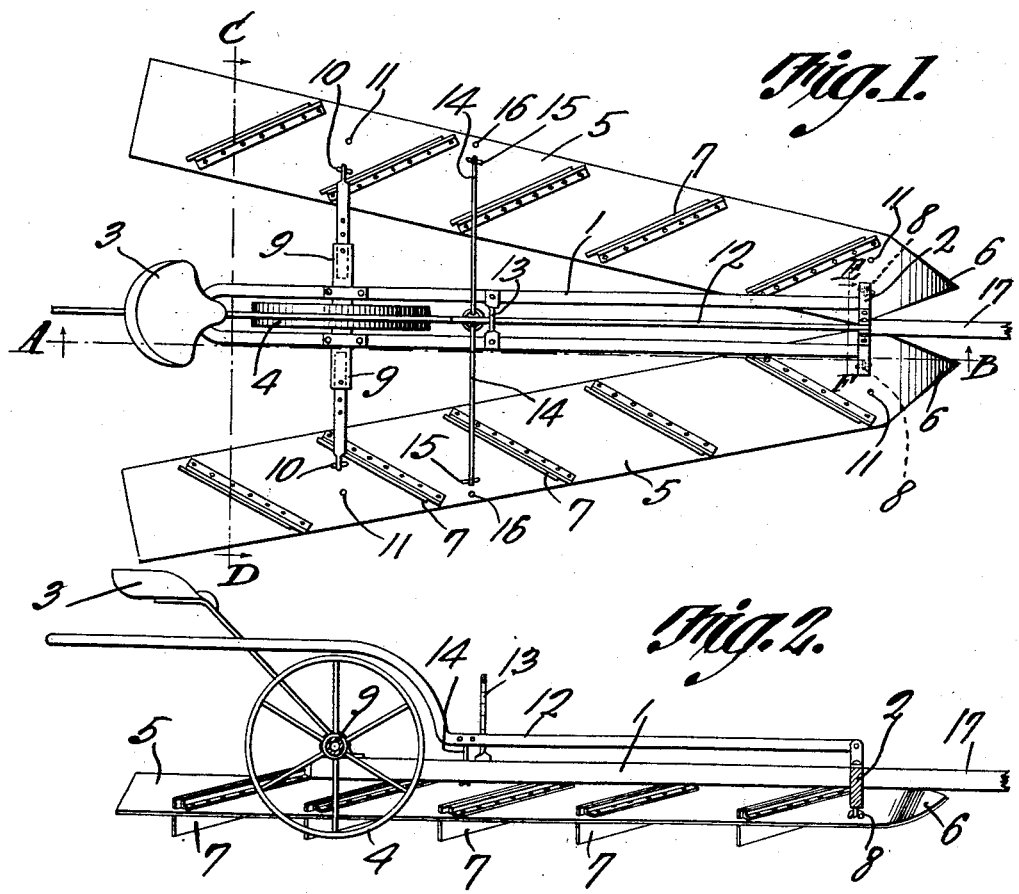
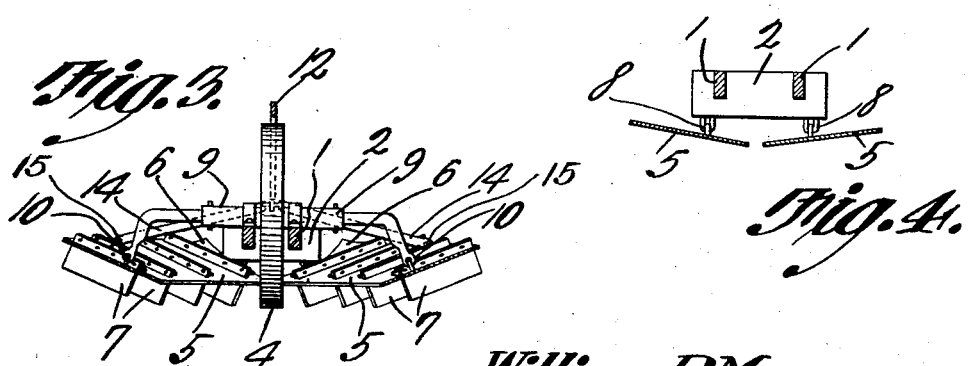
Witnesses
William P. Morrow, Inventor
by C. A. Snow & Co., Attorneys

UNITED STATES PATENT OFFICE.

WILLIAM P. MORROW, OF WOODWARD, OKLAHOMA.

CULTIVATOR.

1,130,924.   Specification of Letters Patent.   Patented Mar. 9, 1915.

Application filed December 6, 1913. Serial No. 805,170.

*To all whom it may concern:*

Be it known that I, WILLIAM P. MORROW, a citizen of the United States, residing at Woodward, in the county of Woodward and State of Oklahoma, have invented a new and useful Cultivator, of which the following is a specification.

This invention relates to cultivators for use between rows after the plants have become too high to be conveniently straddled, one of the objects of the invention being to provide a machine of this character particularly designed to be drawn by a single animal and which will work readily between two adjoining rows either to drag the soil away from or toward the rows as desired.

A further object is to provide means under the control of a single lever whereby the soil engaging members can be simultaneously shifted to any desired angle relative to the surface of the ground.

Another object is to provide a machine of this character which is simple and compact in construction and the soil engaging members of which can be adjusted angularly relative to each other so as to vary the width of the path covered by the machine.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—Figure 1 is a plan view of the machine. Fig. 2 is a section on line A—B Fig. 1, one of the cultivating members being removed. Fig. 3 is a section on line C—D Fig. 1. Fig. 4 is a section on line E—F Fig. 1, said section being on an enlarged scale.

Referring to the figures by characters of reference 1 designates an elongated frame having a front cross strip 2, there being a seat 3 supported above the rear portion of the frame while a ground wheel 4 is journaled within the frame near its rear end. Combined with the frame 1 are elongated plates 5 the front ends of which are curved upwardly, as shown at 6 and are pointed, each of these plates being provided with a series of obliquely disposed soil engaging elements 7 which can be connected to the plate in any suitable manner. The soil engaging elements on each plate or member 5 are duplicates of the elements upon the other member but are arranged at opposite angles so that, when the two members 5 are positioned at opposite sides of the frame 1, the soil engaging elements will either diverge forwardly, as shown in Fig. 1, or converge forwardly. The end portions of the cross strip 2 are connected to the front portions of the members 5 by interfitting eyes 8 or in any other suitable manner whereby the said members 5 are free to swing in any direction relative to the cross strip 2. Telescopic laterally extending arms 9 are extended from the sides of the frame 1 in alinement with the axis of the wheel 4 and the outer ends of these arms 9 are connected, by means of interfitting eyes 10, with the members 5. As shown in the drawings, the eyes 8 and 10 are preferably equal distances from the inner edges of the members 5. It is intended to have these eyes detachably connected to the members 5 so that the said members can be interchanged. Openings 11 are provided in the members for the reception of certain of the eyes when said members are interchanged.

An elongated lever 12 is fulcrumed upon the cross strip 2 and extends rearwardly close to the seat 3 where it can be readily grasped and actuated by the occupant of the seat. The lever is adapted to be held against downward movement by a rack 13 mounted on the frame 1. Links 14 extend in opposite directions from the lever 12 and are connected, at their outer ends, to the members 5 by means of eyes 15. These eyes are preferably detachably connected to the members 5 and openings 16 are provided for the reception of the eyes 15 when the members 5 are interchanged.

It is to be understood that the machine herein described is particularly designed to be drawn by a single animal and is to be used primarily between two adjoining rows of plants. A draft animal may be connected to the machine in any suitable manner and in the drawings a portion of a draft beam has been indicated at 17.

It is to be understood that the telescopic arms 9 can be adjusted in the direction of their length so as to cause the members 5 to adjust angularly about their connections with the cross strip 2. Consequently the width of the machine can be varied as desired. If, at any time, it should be desired to swing the members 5 out of active positions or to hold them in downwardly converging planes during the cultivation of the soil, it is merely necessary to shift lever 12 so as to cause the links 14 to pull upwardly on the members 5, thus causing them to swing about an axis passing through the eyes 8 and 10.

When the machine is drawn forward, the soil engaged thereby will be loosened and pulverized and any weeds in the path of the soil engaging elements will be scraped away. Furthermore should any clods lie in the path of the machine, the members 5 will ride thereover and pulverize them, the entire apparatus operating to produce a dust mulch on the top of the soil whereby the moisture is better retained. By arranging the members 5 as shown in Fig. 1, the soil engaging elements 7 will operate to draw the soil away from the rows between which the machine is moving. However, by interchanging the members 5, said soil engaging elements will deflect the loosened soil toward the rows.

What is claimed is:—

1. A cultivator including a frame, telescoping arms having their inner end portions fixedly connected to the rear portion of the frame, the outer end portions of said telescoping arms being downturned, a supporting wheel journaled within the rear end portion of the frame, an elongated plate at each side of the frame and connected adjacent its front end to the frame, each plate being mounted for vertical and horizontal angular adjustment relative to the frame, soil engaging devices carried by the plates, a lever and means connecting the lever to the plates for tilting the plates simultaneously about longitudinal axes irrespective of the horizontal angular adjustment of the plates, said plates being connected to the telescoping arms.

2. The combination with an elongated frame, a supporting wheel mounted at one end portion thereof, and a lever journaled upon the front end of the frame and extending over the wheel, of elongated plates at opposite sides respectively of the frame and pivotally connected adjacent their front ends to the front end portions of the frame, said connections permitting angular adjustment of the plates horizontally and vertically relative to the frame, a telescopic arm connected to each side of the frame and alining with the axis of the wheel, the outer ends of the telescopic arms being extended downwardly and pivotally connected to the adjacent plates, soil engaging devices carried by the plates, and means connecting said plates to the lever whereby the plates may be tilted simultaneously independently of the horizontal angular adjustment thereof.

In testimony that I claim the foregoing as my own, I have hereto affixed my signature in the presence of two witnesses.

WILLIAM P. MORROW.

Witnesses:
RALPH F. GASTON,
ELBERT GASTON.

Copies of this patent may be obtained for five cents each, by addressing the "Commissioner of Patents, Washington, D. C."